US012423608B2

(12) United States Patent
Takesue et al.

(10) Patent No.: US 12,423,608 B2
(45) Date of Patent: Sep. 23, 2025

(54) COMPUTING DEVICE OF ISING MODEL

(71) Applicants: Nippon Telegraph and Telephone Corporation, Tokyo (JP); Inter-University Research Institute Corporation Research Organization of Information and Systems, Tokyo (JP)

(72) Inventors: Hiroki Takesue, Musashino (JP); Takahiro Inagaki, Musashino (JP); Toshimori Honjo, Musashino (JP); Kensuke Inaba, Musashino (JP); Shoko Utsunomiya, Tokyo (JP); Shuhei Tamate, Tokyo (JP)

(73) Assignees: Nippon Telegraph and Telephone Corporation, Tokyo (JP); Inter-University Research Institute Corporation Research Organization of Information and Systems, Tokyo (JP)

( * ) Notice: Subject to any disclaimer, the term of this patent is extended or adjusted under 35 U.S.C. 154(b) by 491 days.

(21) Appl. No.: 17/916,366

(22) PCT Filed: Apr. 2, 2021

(86) PCT No.: PCT/JP2021/014330
§ 371 (c)(1),
(2) Date: Sep. 30, 2022

(87) PCT Pub. No.: WO2021/201279
PCT Pub. Date: Oct. 7, 2021

(65) Prior Publication Data
US 2023/0153677 A1 May 18, 2023

(30) Foreign Application Priority Data
Apr. 2, 2020 (JP) .................................. 2020-066491

(51) Int. Cl.
*G06N 10/60* (2022.01)
*G02F 1/21* (2006.01)
(Continued)

(52) U.S. Cl.
CPC .............. *G06N 10/60* (2022.01); *G02F 1/212* (2021.01); *G02F 1/3532* (2013.01); *G02F 1/39* (2013.01); *G06N 10/00* (2019.01)

(58) Field of Classification Search
CPC .......... G02F 1/212; G02F 1/3532; G02F 1/39; G06N 10/00; G06N 10/60
See application file for complete search history.

(56) References Cited

U.S. PATENT DOCUMENTS 9,830,555 B2 * 11/2017 Marandi ................. G06E 3/005
10,139,703 B2 * 11/2018 Inagaki .................. G06N 10/60
(Continued)

OTHER PUBLICATIONS

Nii Yamamoto / Utsunomiya QIS Group, *Coherent Ising Machine*, https://qistokyo.wordpress.com/research/coherent-ising-machine/, published before Apr. 2, 2020, pp. 1-8.
(Continued)

*Primary Examiner* — Daniel Petkovsek
(74) *Attorney, Agent, or Firm* — Workman Nydegger

(57) ABSTRACT

A calculation device of the present disclosure is characterized by implementing an item, which expresses a magnetic field, at each site by adding, to the conventional coherent Ising machine, a function for simulating the magnetic field item. Specifically, light having the amplitude of a predetermined sign is input in the conventional coherent Ising machine by dislocating an operation point of the push-pull-type optical modulator. When the operation point is dislocated to a + direction, DOPO (Degenerate Optical Parametric Oscillator) having the same wavelength as that of DOPO of an optical resonator and having a fixed initial phase difference from pump light into which the light is injected
(Continued)

considerably tends to oscillate at 0 phase, and becomes reversed when the operation point is dislocated to a minus direction.

8 Claims, 5 Drawing Sheets

(51) Int. Cl.
  *G02F 1/35* (2006.01)
  *G02F 1/39* (2006.01)
  *G06N 10/00* (2022.01)

(56) References Cited

U.S. PATENT DOCUMENTS

| | | | |
|---|---|---|---|
| 11,017,309 B2* | 5/2021 | Roques-Carmes | G06N 3/045 |
| 11,734,556 B2* | 8/2023 | Meng | G06N 3/0675 |
| | | | 706/43 |

OTHER PUBLICATIONS

T. Inagaki et al., *A Coherent Ising Machine for 2000-Node Optimization* Problems, Science, 2016, vol. 354, Issue 6312, pp. 603-606.

Z. Wang et al., *Coherent Ising Machine Based on Degenerate Optical Parametric Oscillators*, Phys. Rev., 2013, A 88, pp. 063853-1-9.

A. Lucas, *Ising Formulations of Many NP Problems*, Frontiers in Physics, 2014, vol. 2, Article 5, pp. 1-15.

W. H. Steier, *A Push-Pull Optical Amplitude Modulator*, IEEE J. Quant. Electron. 1967, vol. QE-3, No. 12, pp. 664-667.

Shoko Utsunomiya, et al., *Mapping of Ising Models onto Injection-Locked Laser Systems*, Optics Express, Sep. 12, 2011, vol. 19, No. 19, pp. 18091-18108.

Marandi, A., et al. *Network of Time-Multiplexed Optical Parametric Oscillators as a Coherent Ising Machine*, Nature Photonics, Dec. 2014, vol. 8, pp. 937-942.

* cited by examiner

US 12,423,608 B2

COMPUTING DEVICE OF ISING MODEL

TECHNICAL FIELD

This disclosure relates to a calculator and an optical system. In particular, this disclosure relates to a computing device of an Ising model to solve a combinatorial optimization problem.

BACKGROUND ART

Many important problems in the modern society, including the optimization of a distribution route and a wireless frequency allocation, can be reduced to a combinatorial optimization problem. There has been a pressing need to solve a large-size optimization problem with the minimized time and the highest accuracy as possible. In 2011, a "coherent Ising machine" technique wad suggested to use a laser network to solve an Ising problem after which a time-multiplexed system using a degenerate optical parametric oscillator (hereinafter referred to as DOPO) network was suggested, resulting in a larger scale development [Non-patent Literature 1].

A coherent Ising machine has been developed to represent a spin value based on the phases 0 and π of a DOPO pulse to provide the interaction of DOPO pulse groups through the measurement and feedback to thereby solve a ground-state search problem of the theoretical model (Ising model) of spin groupings interacting with each other [Non-patent Literature 2].

Hamiltonian, which is implemented on this coherent Ising machine, is used to represent the interaction between DOPO pulses and is represented by the formula (1) in which $J_{ij}$ is a spin-spin interaction coefficient.

Formula 1

$$H = \Sigma_{i,j} J_{ij} \sigma_i \alpha_j \quad (1)$$

According to the Ising model, the spin $\sigma_i$ having a value {1,−1} has positive and negative analog values in the coherent Ising machine for which the absolute values are approximately represented using the cosine component ci of the amplitude saturated with time development. The spin in the middle of the computation is measured to provide the resultant information based on which a signal for inputting the spin-spin interaction is calculated using FPGA (Field-Programmable Gate Array) and the signal is optically superposed as a feedback and the calculation is repeated until the convergence is achieved. It has been reported that this coherent Ising machine can be used to provide a high-speed solution search to a combinatorial optimization problem called the maximum cut problem.

When the DOPO is implemented as the formula (1), the ith DOPO amplitude ("i" is a natural number) has the time development that is approximately represented by the following formula (1b) [Non-patent Literature 3].

Formula 2

$$\frac{dc_i}{dt} = (-1 + p - c_i^2)c_i - \sum_1^N J_{ij} c_j \quad (1b)$$

In the formula, "p" shows a pump amplitude standardized based on the value of the oscillation threshold of the independent DOPO and "$c_i$" shows the cosine component of the DOPO amplitude standardized based on the amplitude value when p=2 is established. DOPO has a characteristic that the sine component of the amplitude attenuates and thus the DOPO is ignored.

On the other hand, a more generalized Ising model is represented by Hamiltonian of the formula (2).

Formula 3

$$H = -\Sigma_{i,j} J_{ij} \sigma_j \sigma_i - \Sigma_i h_i \sigma_i \quad (2)$$

In the formula, "$J_{ij}$" shows a spin-spin interaction coefficient, "$\sigma_i$" shows the spin in the site i, and "$h_i$" shows a local magnetic field in the site i. The first term of the right side of the formula (2) is a spin-spin interaction term and the second term of the right side is a magnetic term to each spin. It has been known that many types of combinatorial optimization problems such as a four color map problem and a traveling salesman problem can be converted to the Hamiltonian of the formula (2) to calculate a solution.

PATENT LITERATURE

Non-Patent Literature

[Non-patent Literature 1] https://qistokyo.wordpress.com/research/coherent-ising-machine/

[Non-patent Literature 2] T. Inagaki et al., Science, 2016, Vol. 354, pp. 603-606

[Non-patent Literature 3] Z. Wang et al., Phys. Rev., 2013, A 88, 063853-1-9

[Non-patent Literature 4] A. Lucus, Frontiers in physics, 2014, vol. 2, article 5, pp. 1-15

[Non-patent Literature 5] W. H. Steier, IEEE J. Quant. Electron. 1967, vol. QE-3, pp. 664-667

SUMMARY OF INVENTION

In the case of the Hamiltonian the formula (1) of the conventional coherent Ising machine, no magnetic term is provided to each spin as the second term of the left side of the formula (2), thus failing to represent the combinatorial optimization problem such as the four color map problem or the traveling salesman problem. Thus, a disadvantage has been caused in which the problems that can be solved by the conventional coherent Ising machine are limited to the maximum cut problem for example.

This disclosure has been made in view of the above conventional problem. It is an objective of this disclosure to provide a function corresponding to the local magnetic field (hi) by adjusting the operating point of a push-pull-type optical modulator which has been used to generate a feedback signal of the coherent Ising machine.

In order to solve the above-described disadvantage, a modulator of the computing device of the Ising model of this disclosure is obtained by adding a function simulating the magnetic term to the conventional coherent Ising machine to thereby implement a term representing the magnetic field in each site. Specifically, the conventional coherent Ising machine is configured so that the push-pull-type optical modulator has dislocated operating points to thereby receive light having an amplitude having a predetermined sign. The operating point dislocated in the direction+provides a tendency where the DOPO having received the light is oscillated at the phase 0 while the operating point dislocated in the negative direction provides an opposite result.

An aspect of a computing device of an Ising model of this disclosure includes: a phase sensitive amplifier to cause a parametric oscillation at a phase of 0 or π of a plurality of optical pulses that correspond to a plurality of spins of the Ising model and that have the same oscillation frequency; an optical pulse measurement unit for measuring the phases and amplitudes of the plurality of optical pulses outputted from the phase sensitive amplifier; a high-speed computation circuit that calculates, regarding information of the phases and amplitudes of the optical pulses measured by the optical pulse measurement unit as an input, a feedback value based on the interaction regarding an optical pulse that is calculated based on a coupling coefficient of the Ising model and the measured optical pulse to output a feedback signal; and a modulator that modulates, based on the feedback signal calculated by the high-speed computation circuit, the phases and the amplitudes of a plurality of optical pulses in the same number as the inputted plurality of optical pulses to thereby implement the interaction regarding the optical pulse. The modulator is a push-pull modulator that drives two phase modulators provided in both arm waveguides of a Mach-Zehnder interferometer by signals having the same absolute value and different signs so that the driving operation is performed at a point at which light transmitted through the operating point of the modulator has the minimum intensity. During the superposition of the feedback signal, the operating point is shifted in an amount of the voltage corresponding to the applied magnetic field so that a fixed number of light is injected to the DOPO pulses that have the same wavelength as that of the DOPO of the optical resonator and that has a fixed difference in the initial phase from the pump light.

According to this disclosure, various combinatorial optimization problems can be solved by adjusting the operating point of the optical modulator of the coherent Ising machine to implement the local magnetic field term so that a general Ising model including a magnetic term can be represented.

BRIEF DESCRIPTION OF DRAWINGS

FIG. 4(*b*) illustrates the solution method of the four color map problem.

DESCRIPTION OF EMBODIMENTS

Figure 1:
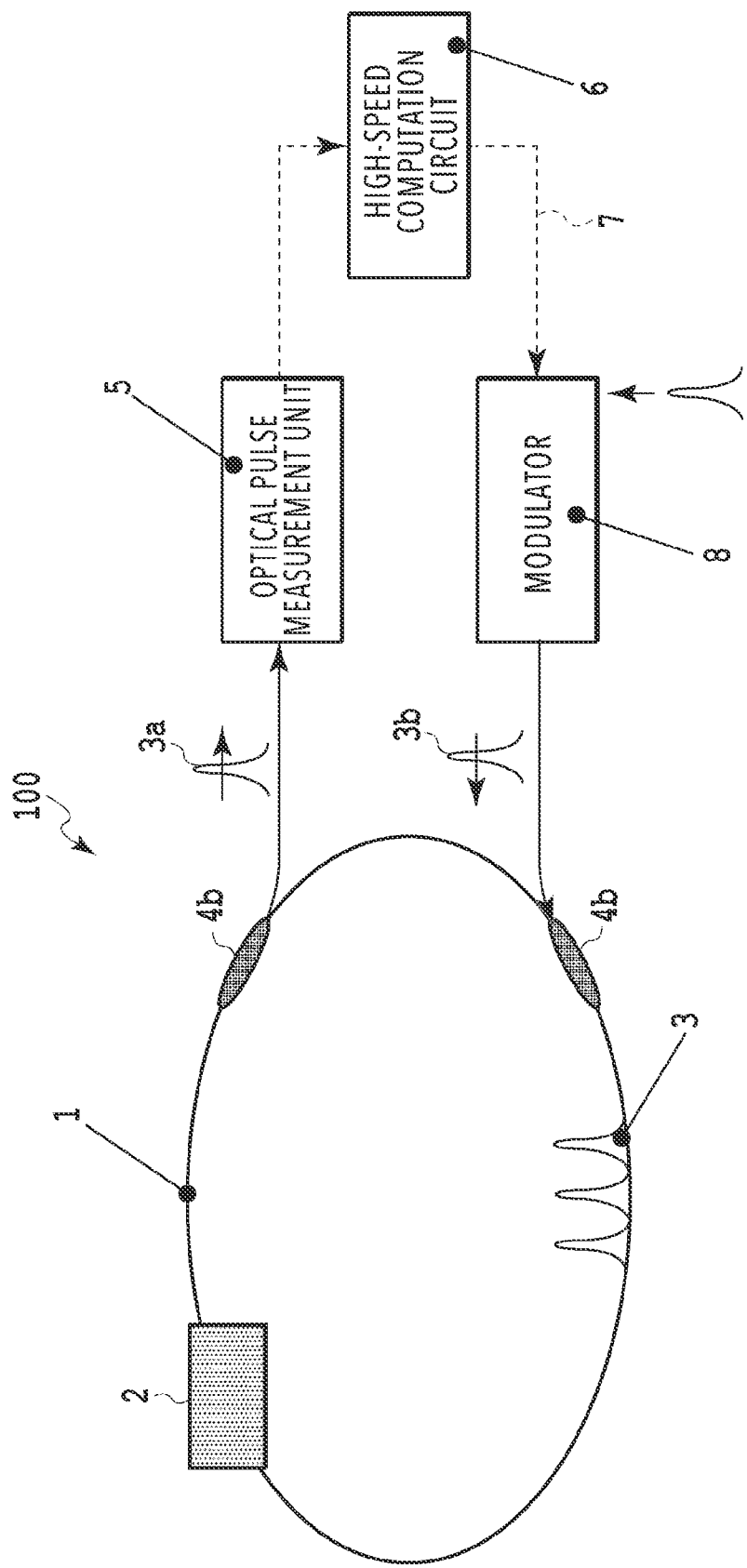
FIG. 1 illustrates the configuration of a computing device of an Ising model according to an illustrative embodiment of the present invention.

The following section will describe in detail an embodiment of the computing device of the Ising model including the optical modulator of this disclosure with reference to the illustrative embodiment and the drawings. However, those skilled in the art will understand that the present invention is not limited to what is described in the following embodiment and may be subjected to various changes in the form and details without departing from the concept of the invention disclosed in this specification for example.

The following section will describe a coherent Ising machine.

A degenerate optical parametric oscillator or DOPO is laser that oscillates only at any of the phase 0 or the phase $\pi$ (with reference to a certain phase reference). A coherent Ising machine uses a synchronization phenomenon by the mutual injection of light between DOPOs. Assume that there are two DOPOs of a DOPO1 and a DOPO2 that oscillate at the same wavelength. When the light of the DOPO1 is injected to the DOPO2 at a phase difference of 0, the DOPO2 tries to oscillate at the same phase as that of the DOPO1 due to the synchronization phenomenon of the light injection. When the light is injected to the DOPO2 at a phase difference of $\pi$, then the DOPO2 tries to oscillate at an opposite phase (phase difference of $\pi$). The coherent Ising machine simulates the spin-spin interaction using such a light injection synchronization phenomenon. [0023] The coherent Ising machine of an embodiment of the present invention simulates not only the above-described spin-spin interaction but also the magnetic term to thereby implement the Ising model represented by the above-described formula (2). In the case of the above-described conventional coherent Ising machine, a problem is given as a relation between DOPOs (i.e., whether or not these two DOPOs have the same phase or opposite phases). Then, such a combination of DOPO phases is calculated that most satisfies the relation(s). Specifically, attention is paid on the phase relation between DOPOs. No condition is imposed regarding which phase each DOPO has. On the other hand, this embodiment simulates the local magnetic field applied to each DOPO. In other words, the wording "the local magnetic field applied" means that each DOPO is instructed to act on the condition to "oscillate at the phase 0 if possible" or to "oscillate at the phase it if possible". Specifically, each DOPO receives the injection of "the light having the phase difference of 0" or "the light having the phase difference of $\pi$" with regard to phase reference. These injected light is not based on other DOPOs of the mutual injection but based on the laser by the pump light used in the DOPO as a "phase reference".

A DOPO pulse is generated by placing an optical amplifier called a phase sensitive amplifier in an optical resonator to input pump light to this phase sensitive amplifier. The phase sensitive amplifier is configured to have a nonlinear optical medium. The phase sensitive amplifier includes the nonlinear optical medium to maximumly amplify such light injected to the optical resonator that has an initial phase difference of 0 or $\pi$ to the pump light. Thus, the DOPO pulse causes the light oscillation at a phase difference of 0 or a phase difference of $\pi$ at which the highest gain is generated.

By using the "measurement/feedback method" to simulate a magnetic term to add conditions to the DOPO, such a coherent Ising machine is realized that allows arbitrary interaction term and magnetic term to be implemented among all DOPOs. As a result, a complicated graph having many vertices and sides can be solved directly.

[Illustrative embodiment 1] This embodiment uses the "measurement/feedback method" according to which a long-distance light fiber ring resonator having the total length of 1 km includes N DOPO optical pulse groups 3 (N is a natural number) generated simultaneously. Then, the N DOPO optical pulse groups 3 are partially extracted and are subjected to measurement, computation, and modulation. Then, the modulated DOPO pulses are returned to the resonator.

FIG. 1 illustrates the outline of the configuration of a computing device 100 of the Ising model of this embodiment. In FIG. 1, The computing device of the Ising model includes: an optical resonator 1 composed of ring-like optical fibers; a phase sensitive amplifier 2 provided in the optical resonator 1; an optical pulse measurement unit 5 constituting a part of a feedback loop branched from the optical resonator 1; a high-speed computation circuit (FPGA) 6; and an optical modulator (modulator) 8. The computing device of the Ising model of this embodiment is configured so that the optical pulse measurement unit 5, the high-speed computation circuit (FPGA) 6, and the optical modulator 8 constitute the feedback loop. The optical resonator 1 is connected to the feedback loop via couplers 4a and 4b.

Figure 2:
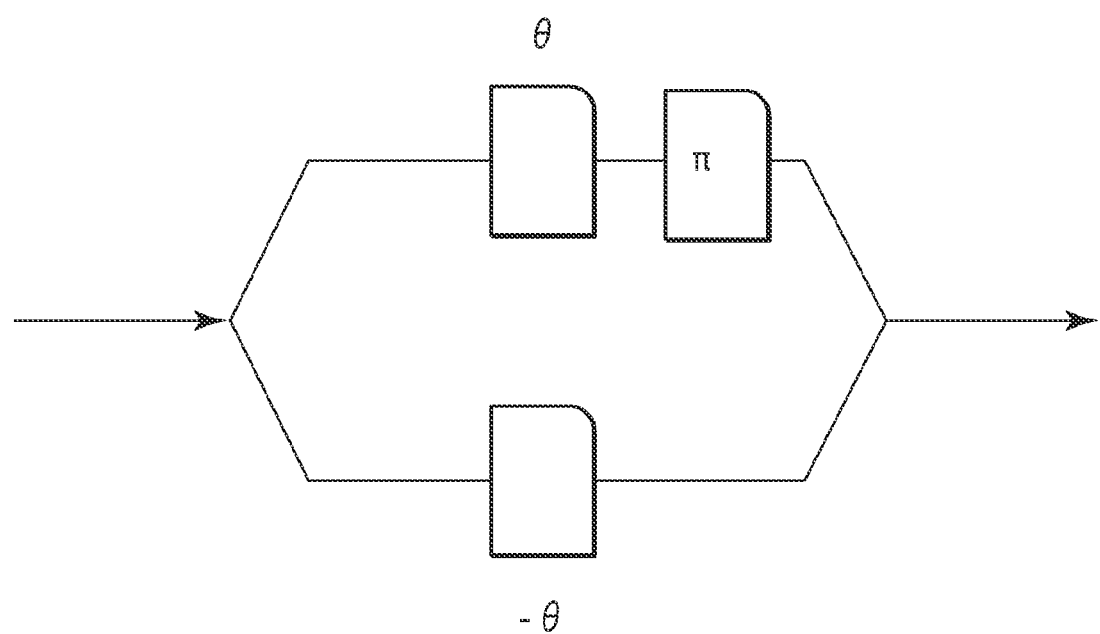
FIG. 2 illustrates a push-pull modulator.

As shown in FIG. 1, the computing device 100 of the Ising model is configured so that the pump optical pulse (pump) is injected to the phase sensitive amplifier (PSA: Phase Sensitive Amplifier) 2 provided in ring-like optical fibers functioning as the optical resonator 1 to thereby generate the DOPO optical pulse groups 3 in the number corresponding to the number of sites of Ising model (binarization OPO: Optical Parametric Oscillation: the light parametric oscillation of the phase of 0 or $\pi$). An optical pulse 3a, which is branched from the DOPO optical pulse group 3 via the coupler 4a within the optical resonator 1, is measured by the optical pulse measurement unit 5 regarding the phase and the amplitude thereof. A high-speed computation circuit (FPGA) 6 calculates a feedback signal 7 based on the interaction regarding an optical pulse determined based on the measured optical pulse 3a and the coupling coefficient of the Ising model given in advance using the information of the phase and the amplitude of the optical pulse measured by the optical pulse measurement unit 5. In the case of the computing device of the Ising model (coherent Ising machine) 100 based on the measurement/feedback method, the feedback signal 7 measured by the high-speed computation circuit (FPGA) 6 is superposed by the optical modulator 8 on an optical pulse that has the same wavelength as that of the DOPO in optical modulator 8 and that has a fixed initial phase difference from the pump light to thereby providing the coupling between DOPOs. The optical modulator 8 is called a push-pull modulator as shown in FIG. 2 or is the optical modulator [Non-patent Literature 5] that drives two phase modulators provided in both arm waveguides of a Mach-Zehnder interferometer by signals having the same absolute value and different signs so that the driving operation is performed at a point at which light transmitted through the operating point has the minimum intensity. When an input signal is 0, then the transmissivity is zero (i.e., no light is caused). When an input signal is +, light having an amplitude having a positive sign to the input light is outputted. When an input signal is −, light having an amplitude having a negative sign to the input light is outputted. This corresponds to that the input light is modulated at a phase of 0 or $\pi$ Depending on the magnitude of the input signal, the amplitude of the output signal also can be changed.

Figure 3:
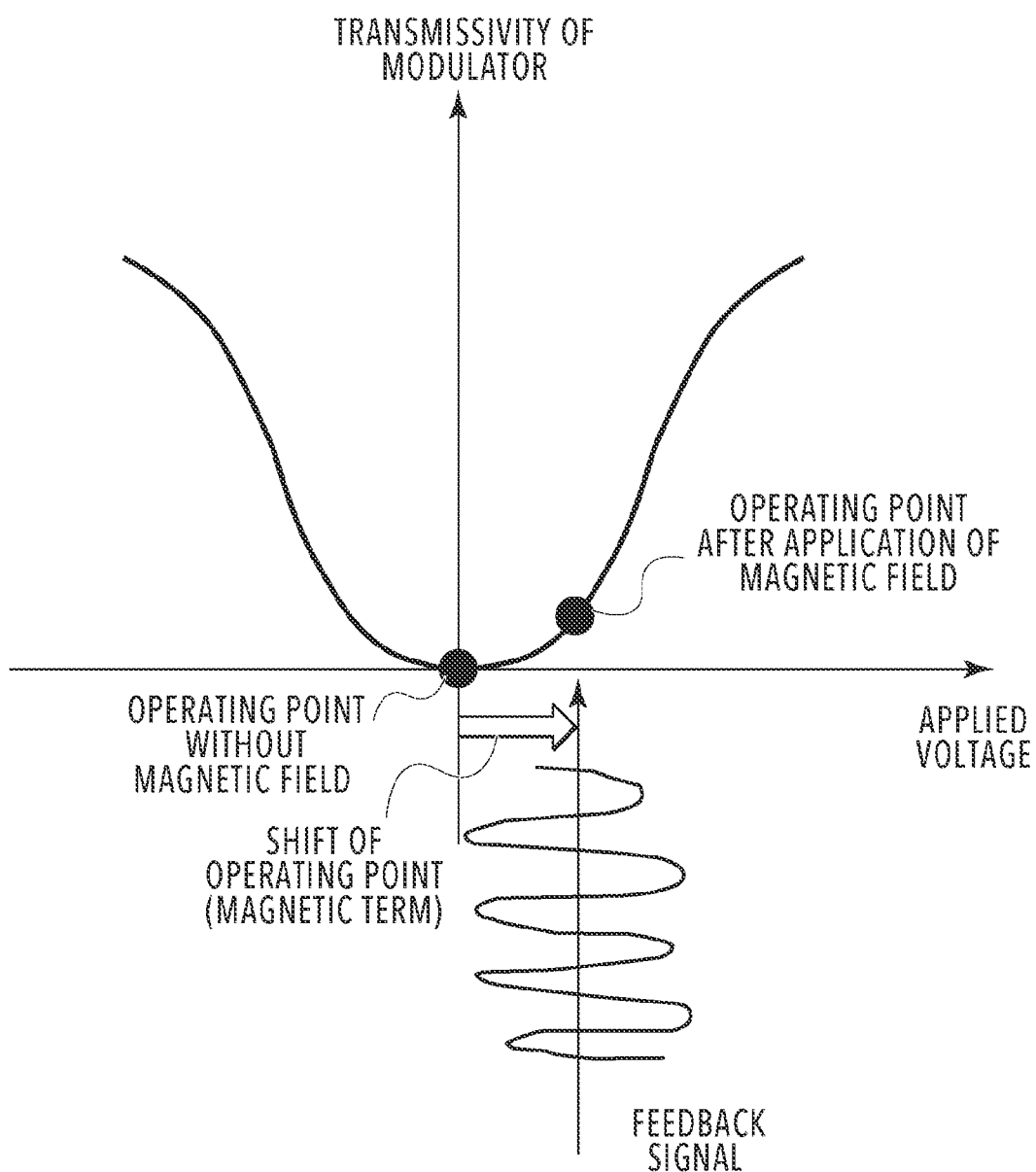
FIG. 3 illustrates the relation between a voltage applied to the optical modulator and the transmissivity of the optical modulator.

As shown in FIG. 3, when assuming that horizontal axis shows a voltage applied to the modulator while the vertical axis shows the light transmissivity of the modulator, then the operating point of the push-pull modulator can be dislocated (or shifted) in the direction shown by the arrow to thereby input lights (a fixed number of lights) having an amplitude having a predetermined sign to DOPO pulses having the same wavelength as the DOPO of the optical resonator and having a fixed initial phase difference from the pump light. For example, by dislocating the operating point in the direction+, the DOPO having received the light has a tendency to oscillate at the phase 0. The shift (magnetic term) of the operating point shows a difference between the operating point after the application of the magnetic field and the operating point when no magnetic field is applied. Specifically, the effect corresponding to the above-described "magnetic field" can be provided.

Via the coupler 4b, the modulated DOPO optical pulse 3b is injected to the ring resonator 1. By repeating the above procedure, the N DOPO pulses are generated by inputting N pump pulses to the PSA per the time required for one cycle of the resonator. In this manner, 2048 arbitrary DOPO pairs for example can be coupled, resulting in the total 4 million combinations.

Figure 4:
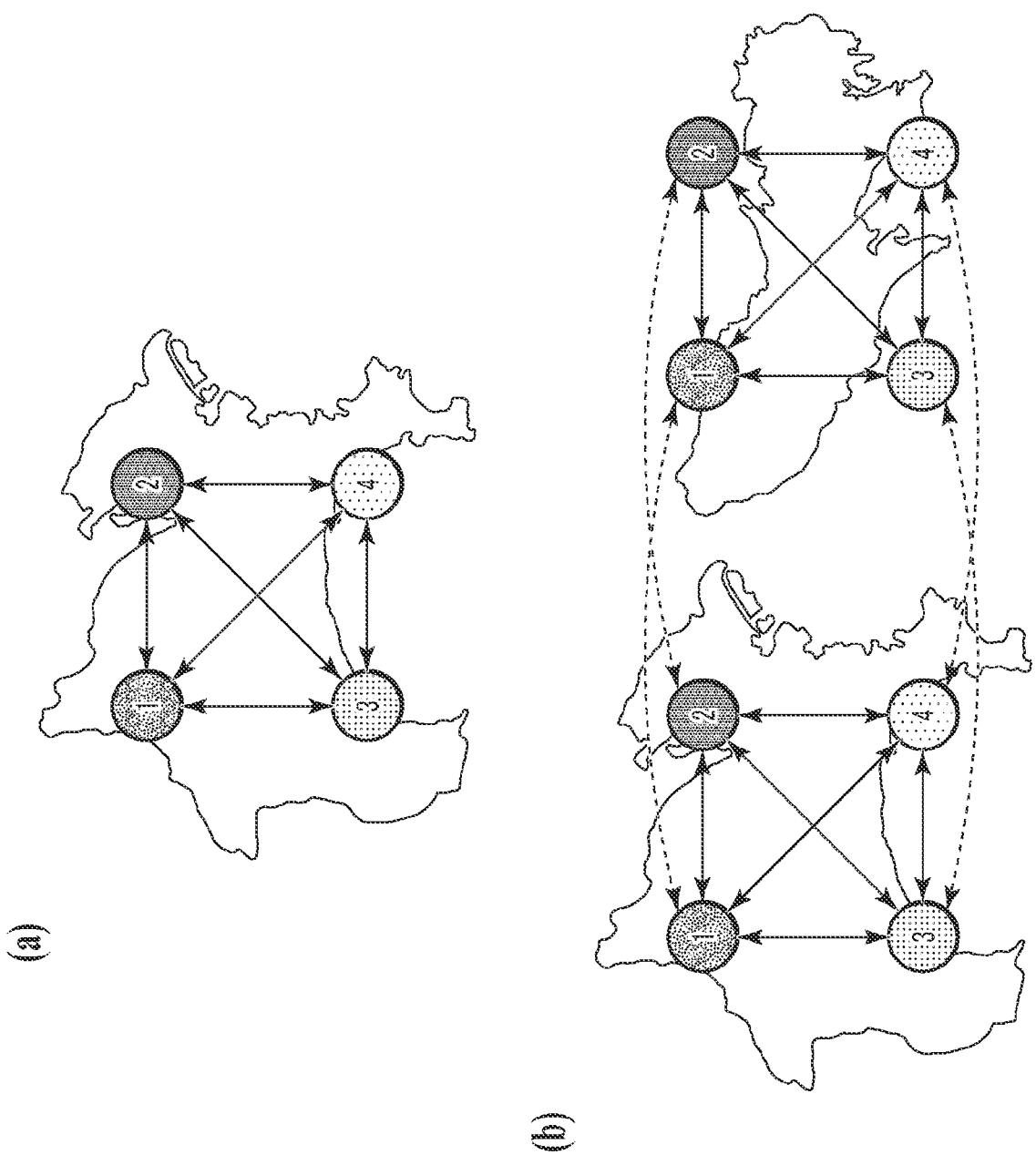
FIG. 4(*a*) illustrates the solution method of a four color map problem.
Figure 5:
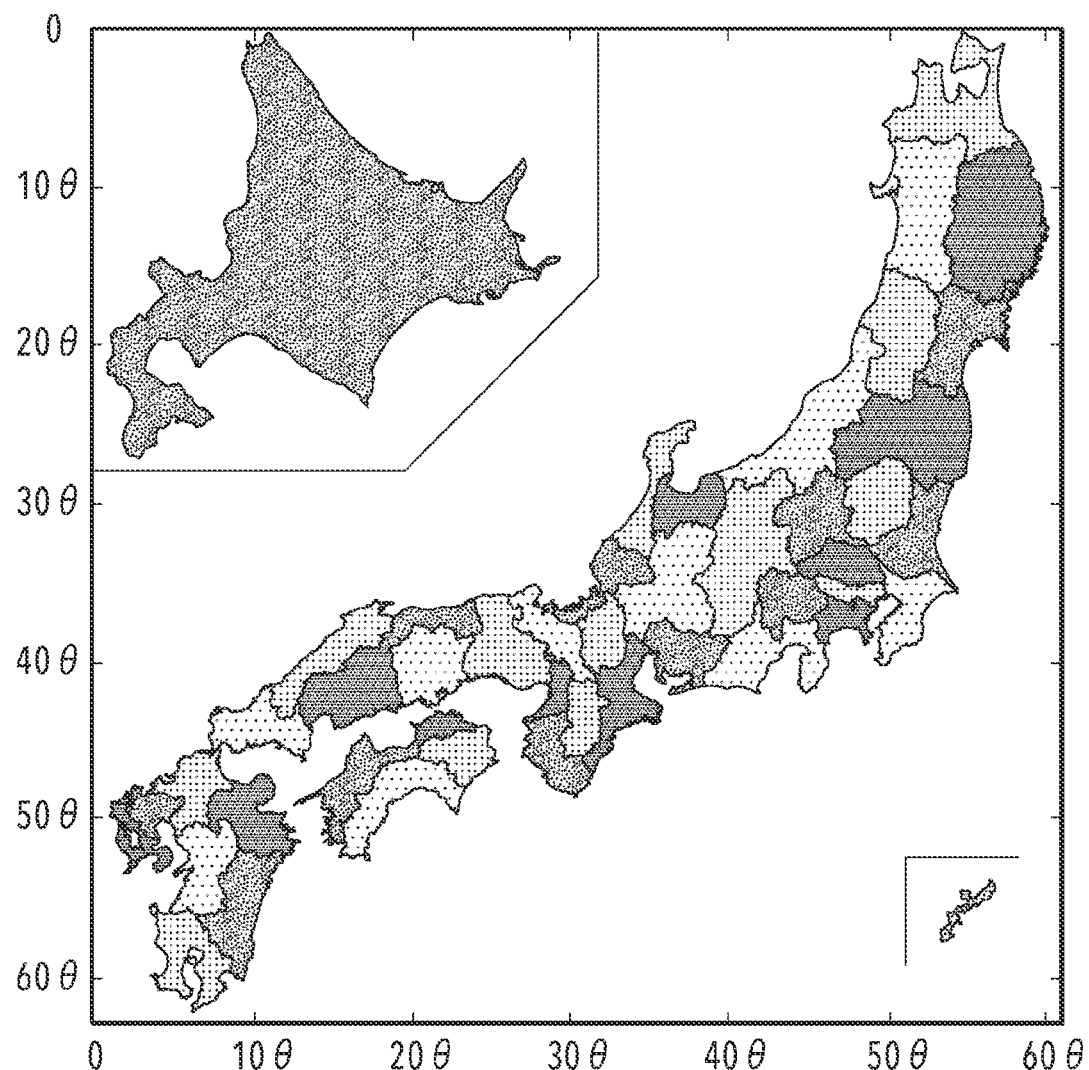
FIG. 5 illustrates the experiment result according to an illustrative embodiment of the present invention (four color map problem).

The following section will describe, using the measurement/feedback method of this illustrative embodiment, a method of implementing the partition painting of a map based on the four color theorem. This problem is a problem where the respective prefectures are painted with four colors so that the adjacent prefectures are prevented from having the same color. A common method used to solve this problem uses conditions according to which spins corresponding to the four colors are assigned to the respective prefectures so that only any one of the four spins is an up spin and the other spins are down spins and adjacent prefectures have opposite spin values. This method uses the four colors of red (R), green (G), blue (B), and yellow (Y). The spins corresponding to the R, G, B, and Y of the respective prefectures are all coupled to apply a bias term to the entirety. This provides the maximum energy reduction when any one of the four spins is up. Using this theorem, the above-described conditions are provided that "only any one of the four spins is up" or a condition to provide each prefecture with one color (FIG. 4(a)). By providing the same color spin coupling of the adjacent prefectures as am antiferromagnetic coupling, such conditions can be provided that prevent the adjacent prefectures from having the same color (FIG. 4(b)).

The computing device of the Ising model includes: the phase sensitive amplifier 2 to cause a parametric oscillation at a phase of 0 or $\pi$ of a plurality of optical pulses that correspond to a plurality of spins of the Ising model and that have the same oscillation frequency; the optical pulse measurement unit 5 that measures the phases and the amplitudes of the plurality of optical pulses outputted form the phase sensitive amplifier 2; the high-speed computation circuit 6 that calculates, regarding information of the phases and amplitudes of the optical pulses measured by the optical pulse measurement unit 5 as an input, a feedback value based on the interaction regarding an optical pulse that is calculated based on a coupling coefficient of the Ising model and the measured optical pulse to output a feedback signal; and an optical modulator 8 that modulates, based on the feedback signal calculated by the high-speed computation circuit 6, the phases and the amplitudes of a plurality of optical pulses in the same number as the inputted plurality of optical pulses to thereby implement the interaction regarding the optical pulse. The optical modulator 8 is a push-pull modulator that drives two phase modulators provided in both arm waveguides of a Mach-Zehnder interferometer by signals having the same absolute value and different signs so that the driving operation is performed at a point at which light transmitted through the operating point of the modulator has the minimum intensity. During the superposition of the feedback signal 7, the operating point is shifted in an amount of the voltage corresponding to the applied magnetic field so that a fixed number of light is injected to the DOPO pulses that have the same wavelength as that of the DOPO of the optical resonator and that has a fixed difference in the initial phase from the pump light. The use of such a computing device has demonstrated that the combination of the measurement/feedback method and a simulated magnetic term can provide more various combinatorial optimization problems.

[Illustrative embodiment 2] The following section will describe a method of dislocating operating points in the simplest manner. In this illustrative embodiment, a fixed number voltage is used as a voltage shift of an operating point. According to this method, depending on a local magnetic field hi in question (the formula (1)), the operating point is dislocated by a fixed number. Generally, different values are assigned to the ith DOPO, thus providing the modulation of a pulse light based on a predetermined pattern. In order to provide a feedback to the ith DOPO, a signal applied to the modulator is obtained by adding a fixed number magnetic term to the second term of the right side of the formula (1b) corresponding to the spin-spin interaction.

Formula 4

$$s_i = (-\Sigma_j J_{ij} c_j - h_i) r \qquad (3)$$

In the formula, "cj" shows the measurement result of the cosine component of the jth pulse amplitude and "r" shows a proportion coefficient. The first term of the right side of the formula (2) shows an output signal from the FPGA that is used to compute the measurement result. The second term may be similarly outputted from the high-speed computation circuit (FPGA) 6. Alternatively, a signal outputted from another waveform generator may be electrically added to the signal outputted from the FPGA.

[Illustrative embodiment 3] This illustrative embodiment provides a method of providing a voltage shift of the operating point based on a predetermined function. In the formula (2), the local magnetic field hi changes based on a predetermined function with time (DOPO cycle number). For example, a linear increase may be used.

Formula 5

$$s_i = (-\Sigma_j J_{ij} c_j - h_i(t)) r \qquad (4)$$

[Illustrative embodiment 4] This illustrative embodiment uses the voltage proportional to the DOPO amplitude $c_i$ obtained through the measurement of the ith pulse as a voltage shift of the above operating point in the ith DOPO (i is a natural number).

At the start of the calculation, the DOPO pulse starts with the optical power of 0. Noise light outputted from the phase sensitive amplifier 2 cause one cycle in the optical resonator 1 and the gradual amplification by the phase sensitive amplifier 2. Thus, each pulse has a different magnitude of amplitude in the initial calculation state. This is guaranteed by the illustrative embodiments 4-6. Most simply put, a signal proportional to "ci" obtained through the measurement is added as a magnetic term.

Formula 6

$$s_i = (-\Sigma_j J_{ij} c_j - h_i c_i) r \qquad (5)$$

[Illustrative embodiment 5] This illustrative embodiment uses a voltage proportional to the absolute value $c_i$ of the DOPO amplitude obtained through the measurement of the ith pulse as a voltage shift of the operating point in the ith DOPO (n is a natural number). A signal proportional to the absolute value of "$c_i$" is added as a magnetic term.

Formula 7

$$s_i = (-\Sigma_j J_{ij} c_j - h_u |c_i|) r \qquad (6)$$

[Illustrative embodiment 6] According to this illustrative embodiment, a signal proportional to an average value of the absolute values of the measurement results of all pulses is added as a magnetic term. Specifically, as a voltage shift of the above operating point in the ith DOPO (i is a natural number), a voltage proportional to the average of the absolute values of the DOPO amplitudes obtained through the measurement of all pulses is used (N is the total number of pulses and "$C_i$" is the DOPO amplitude).

Formula 8

$$\sum_i \frac{c_i}{N} \qquad (7)$$

("N" is the total number of pulses and "$C_i$" is the DOPO amplitude.)

Formula 9

$$s_i = \left(-\sum_j J_{ij} c_j - h_i \sum_j \frac{|c_j|}{N}\right) r \qquad (8)$$

[Illustrative embodiment 7] According to this illustrative embodiment, a signal of the combination of the second terms in the parentheses of the formulae (2)-(6) and (8) is added as a magnetic term. The operation is performed so that the formula (9) is satisfied by simultaneously combining a plurality of configurations of the configurations shown in the above-described illustrative embodiments 2-6.

Formula 10

$$s_i = (-\Sigma_j J_{ij} c_j - (A\ h_i + B\ h_i(t) + C\ h_i c_i + D\ h_i |c_i| + E\ h_i \Sigma_j |c_j| / N)) r \qquad (9)$$

The terms "A", "B", "C", and "D" are an arbitrary real number.

The illustrative embodiments 3-7 are similar to the illustrative embodiment 2 in that the feedback signal 7 may be outputted from the high-speed computation circuit (FPGA) 6. Alternatively, a signal outputted from another waveform generator may be electrically added to the signal outputted from the high-speed computation circuit (FPGA) 6.

INDUSTRIAL APPLICABILITY

This disclosure can be applied to the technical field of the computing device of the Ising model to solve a combinatorial optimization problem.

The invention claimed is:
1. A computing device of the Ising model, comprising:
a phase sensitive amplifier for causing a parametric oscillation at a phase of 0 or π of a plurality of optical pulses that correspond to a plurality of spins of the Ising model and that have the same oscillation frequency;
an optical pulse measurement unit for measuring the phases and amplitudes of the plurality of optical pulses outputted from the phase sensitive amplifier;
a high-speed computation circuit that calculates, regarding information of the phases and amplitudes of the optical pulses measured by the optical pulse measurement unit as an input, a feedback value based on the interaction regarding an optical pulse that is calculated based on a coupling coefficient of the Ising model and the measured optical pulse to output a feedback signal; and a modulator that modulates, based on the feedback signal calculated by the high-speed computation circuit, the phases and the amplitudes of a plurality of optical pulses in the same number as the inputted plurality of optical pulses to thereby implement the interaction regarding the optical pulse, wherein:

the modulator is a push-pull modulator that drives two phase modulators provided in both arm waveguides of a Mach-Zehnder interferometer by signals having the same absolute value and different signs so that the driving operation is performed at a point at which light transmitted through the operating point of the modulator has the minimum intensity, and during the superposition of the feedback signal, the operating point is shifted in an amount of the voltage corresponding to the applied magnetic field so that a fixed number of light is injected to DOPO (Degenerate Optical Parametric Oscillator) pulses that have the same wavelength as that of DOPO pulses of an optical resonator and that has a fixed difference in an initial phase from pump light.

2. The computing device of the Ising model according to claim 1, wherein a fixed number voltage is used as a voltage shift of the operating point.

3. The computing device of the Ising model according to claim 1, wherein the voltage shift of the operating point is provided by a voltage change based on a predetermined function.

4. The computing device of the Ising model according to claim 3, wherein the voltage change is a linear increase.

5. The computing device of the Ising model according to claim 1, wherein such a voltage is used that is proportional to DOPO amplitude $c_i$ obtained through the measurement of ith pulse (i is a natural number) of the DOPO pulses as a voltage shift of the operating point in the ith pulse.

6. The computing device of the Ising model according to claim 1, wherein such a voltage is used that is proportional to the absolute value ci of DOPO amplitude obtained through the measurement of ith pulse (i is a natural number) of the DOPO pulses as a voltage shift of the operating point in the ith.

7. The computing device of the Ising model according to claim 1, wherein as a voltage shift of the operating point in ith DOPO pulse (i is a natural number) of the DOPO pulses, a voltage proportional to the average of the absolute values of DOPO amplitudes obtained through the measurement of all pulses is used when assuming that N is the total number of pulses and "$C_i$" is DOPO amplitude,

[Formula 1]

$$\sum_i \frac{c_i}{N}.$$

8. The computing device of the Ising model according to claim 1, wherein:

the computing device of the Ising model is configured to operate to satisfy the following formula by simultaneously combining a plurality of configurations from among:

a first configuration using a fixed number voltage as a voltage shift of the operating point;

a second configuration causing a voltage change as a voltage shift of the operating point based on a predetermined function;

a third configuration causing a voltage change as a voltage shift of the operating point based on a predetermined function and the voltage change is a linear increase;

a fourth configuration configured to use a voltage that is proportional to the DOPO amplitude $c_i$ obtained through the measurement of the ith pulse as a voltage shift of the operating point in ith DOPO pulse (i is a natural number) of the DOPO pulses; and a fifth configuration configured to use a voltage that is proportional to the absolute value $c_i$ of DOPO amplitude obtained through the measurement of the ith pulse as a voltage shift of the operating point in the ith DOPO pulse (i is a natural number),

[Formula 2]

$$s_i = \left(-\sum_j J_{ij} c_j - \left(Ah_i + Bh_i(t) + Ch_i c_i + Dh_i |c_i| + Eh_i \sum_j \frac{|c_j|}{N}\right)\right) r$$

wherein A, B, C, D, and E are an arbitrary real number.

* * * * *